June 21, 1955  F. LANG  2,711,160

DIESEL ENGINES

Filed Aug. 8, 1951

INVENTOR.
FRANZ LANG
BY
ATTORNEY

United States Patent Office 2,711,160
Patented June 21, 1955

2,711,160

DIESEL ENGINES

Franz Lang, Munich, Germany

Application August 8, 1951, Serial No. 240,917

3 Claims. (Cl. 123—32)

My invention relates to diesel engines with energy cell and with a combustion or turbulence chamber arranged in the cylinder head eccentrically to the cylinder axis.

In such diesel engines combustion or turbulence chambers of many different shapes have been suggested. However, all these chambers contained dead corners which prevented a perfect whirling within the chamber and a full utilization of the fuel charge in view of the deficient scavenging of said chamber.

The object of my invention is to avoid the said disadvantages and to create a combustion or turbulence chamber in which a highly efficient flow of air is achieved and which is completely cleared from combustion gases before fresh fuel is injected.

According to my invention the combustion or turbulence chamber is composed of a basically cylindrical portion adjoining the cylinder bore and of a superimposed cupolar portion which may be either hemispherical or have the shape of a truncated cone, and wherein the outer edge of said cylindrical portion is beveled off or rounded off in such manner, that the beveling or the rounding off radii, respectively, gradually decrease from a maximum value at the portion farthest away from the cylinder wall towards the edge portion near the cylinder wall. Thus the air pressed into the combustion chamber is forced to flow therethrough in a manner assuring complete removal of combustion gases.

The said and other objects of my invention will be more fully understood from the following specification when taken with the accompanying drawing in which two embodiments are illustrated.

Figure 1:
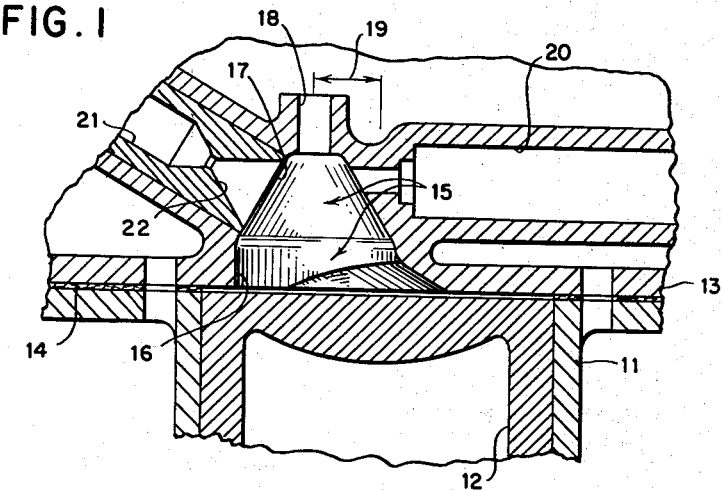
Figure 2:
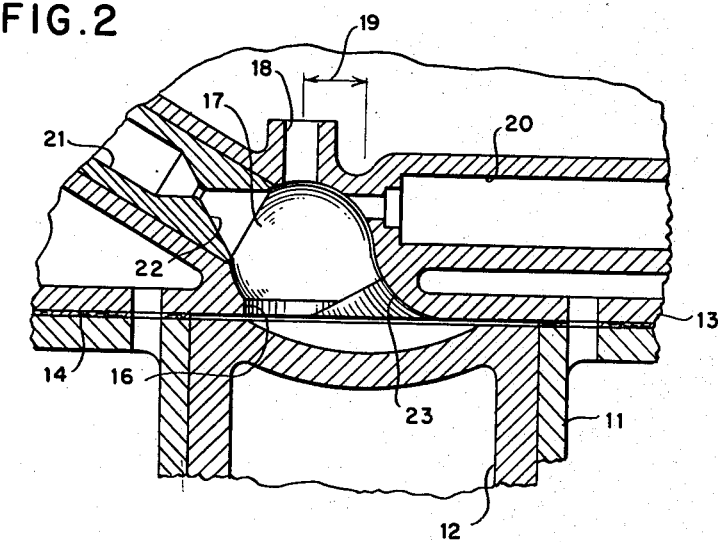

Each of Figs. 1 and 2 shows a longitudinal section though the pertinent part of a cylinder head of a diesel engine with the adjoining portion of the engine cylinder and the piston moving therein.

The same reference characters indicate the same parts in each figure.

Fig. 1 shows the engine cylinder 11, the flat crowned piston 12 moving therein and the cylinder head 13 attached thereto with an interposed gasket 14. The combustion chamber 15 is arranged eccentrically to the cylinder axis the eccentricity being indicated at 19 and said chamber is composed of an essentially cylindrical section 16 facing the piston 12 and a superimposed cupolar section 17 which has the shape of a truncated cone. In the top of the said cupolar section is a bore 18 which will permit to connect thereto any desired measuring, controlling a similar apparatus.

The fuel injection nozzle is mounted in the cylinder head in the bore 20 leading into the combustion chamber 15 and opposite thereto is the energy cell 21 with its funnelled mouth 22. The axis of the energy cell 21 is inclined against the central portion of the cylinder bore. As appearing from the drawing the shape of the combustion chamber permits to arrange the bore 20 for the injection nozzle and the energy cell 21 relatively high above the bottom surface of the cylinder head so that cooling water jackets may be provided.

A part of the outer edge of the cylindrical section 16 of the combustion chamber is beveled off as indicated by the reference 10. The beveling is greatest in the edge portion farthest away from the cylinder wall and decreases to both sides thus forming a spoutlike enlargement of the opening of said cylindrical portion.

The embodiment shown in Fig. 2 differs from that described before therein that a concave crowned piston 12 is used and that the cupolar section 17 of the combustion chamber is hemispherical. The outer edge of the cylindrical section 16 of said chamber is rounded off to pass into the bottom surface of the cylinder head and the rounding off radius is greatest at 23 and decreases towards the edge portions near the cylinder wall.

Where my invention is applied to diesel engines of the two cycle type with inlet ports and exhaust ports in the cylinder wall in the bottom dead center zone the inlet ports are advantageously arranged in the cylinder wall portion below the energy cell 21 and the exhaust ports opposite thereto.

While two embodiments of my invention have been shown and described in detail to illustrate the application of the principles of my invention, it will be well understood that my invention may be otherwise embodied without departing from such principles.

What I claim as my invention is:

1. In a diesel engine including an engine cylinder, a piston reciprocating therein, a cylinder head topping said cylinder, and a combustion chamber in said head eccentrical to the cylinder axis, the improvement comprising in combination a combustion chamber composed of a substantially cylindrical base section adjoining the cylinder bore and a superimposed cupolar section; the height of said cylindrical section being a fraction of its diameter and its axis being parallel to the axis of the cylinder; an energy cell opening laterally into said cupolar section; the longitudinal axis of said energy cell being located in a plane defined by the axis of the cylinder and that of said cylindrical base section and being slantingly directed towards the inner portion of the crown of the piston in its top dead position; a fuel injector entering the combustion chamber opposite the said energy cell to cooperate therewith; the edge of said cylindrical section facing the cylinder bore being beveled off substantially in the direction of said slanting longitudinal axis of the energy cell; and the beveling off of said edge uniformly decreasing from its portion nearest to the axis of the cylinder in both directions around the base section of the cylinder.

2. In a diesel engine including an engine cylinder, a piston reciprocating therein, a cylinder head topping said cylinder, and a combustion chamber in said head eccentrical to the cylinder axis, the improvement comprising in combination a combustion chamber composed of a substantially cylindrical base section adjoining the cylinder bore and a superimposed cupolar section having the shape of an upstarting truncated cone; the height of said cylindrical section being a fraction of its diameter and its axis being parallel to the axis of the cylinder; an energy cell opening laterally into said cupolar section; the longitudinal axis of said energy cell being located in a plane defined by the axis of the cylinder and that of said cylindrical base section and being slantingly directed towards the inner portion of the crown of the piston in its top dead position; a fuel injector entering the combustion chamber opposite the said energy cell to cooperate therewith; the edge of said cylindrical section facing the cylinder bore being beveled off substantially in the direction of said slanting longitudinal axis of the energy cell; and the beveling off of said edge uniformly decreasing from its portion nearest to the axis of the cylinder in both directions around the base section of the cylinder.

3. In a diesel engine including an engine cylinder, a piston reciprocating therein, a cylinder head topping said cylinder, a combustion chamber in said head eccentrical to the cylinder axis, the improvement comprising in combination a combustion chamber composed of a substantially cylindrical base section adjoining the cylinder bore and a superimposed semispherical section; the height of said cylindrical section being a fraction of its diameter and its axis being parallel to the axis of the cylinder; an energy cell opening laterally into said semispherical section; the longitudinal axis of said energy cell being located in a plane defined by the axis of the cylinder and that of said cylindrical base section and being slantingly directed towards the inner portion of the crown of the piston in its top dead position; a fuel injector entering the combustion chamber opposite the said energy cell to cooperate therewith; the edge of said cylindrical section facing the cylinder bore being beveled off substantially in the direction of said slanting longitudinal axis of the energy cell; said beveling off of said edge uniformly decreasing from its portion nearest to the axis of the cylinder in both directions around the base section of the cylinder; and the beveled off surface in its portion nearest to the cylinder axis passing into the adjoining inner surface of the semispherical section.

References Cited in the file of this patent

FOREIGN PATENTS

| | | |
|---|---|---|
| 401,703 | Great Britain | Nov. 14, 1933 |
| 556,000 | Great Britain | Sept. 15, 1943 |